May 8, 1956     C. T. HALVORSON     2,744,998
REMOVABLE FOG LIGHT
Filed April 17, 1952
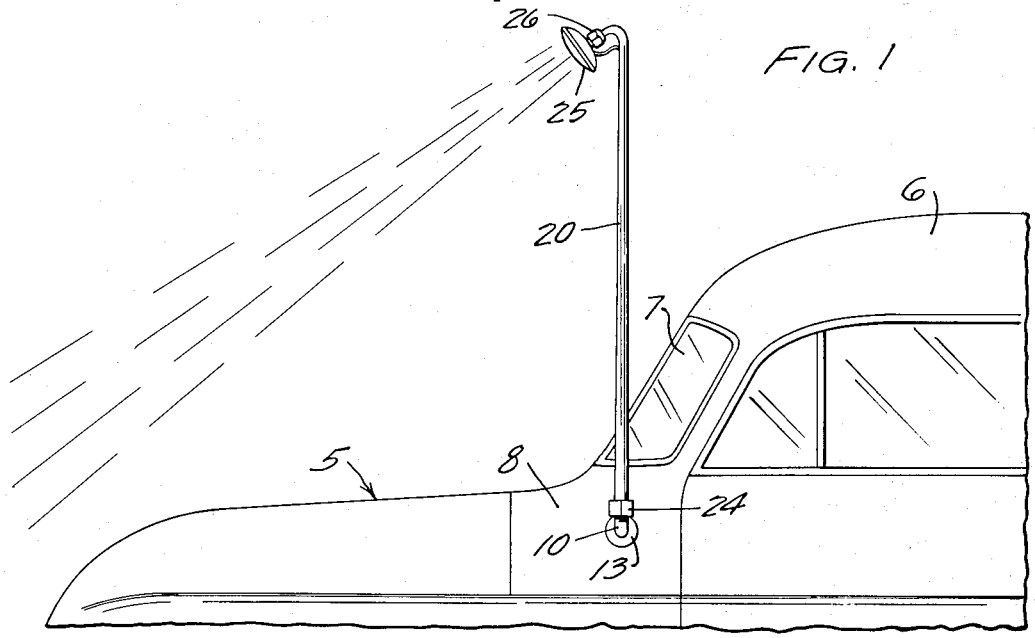
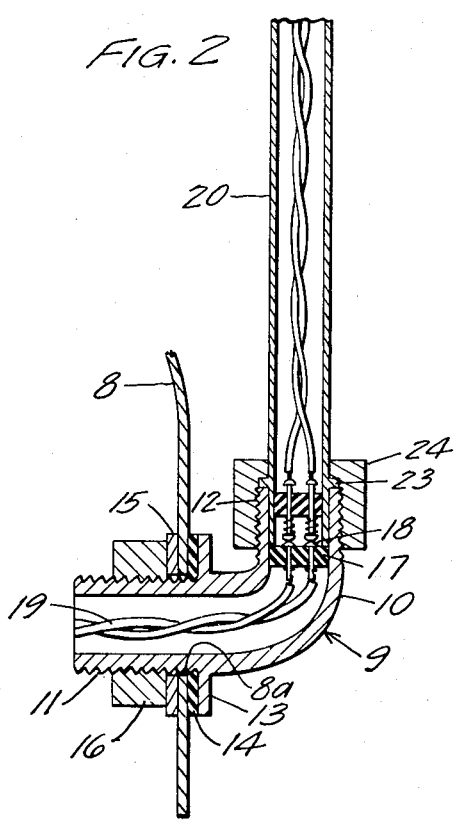
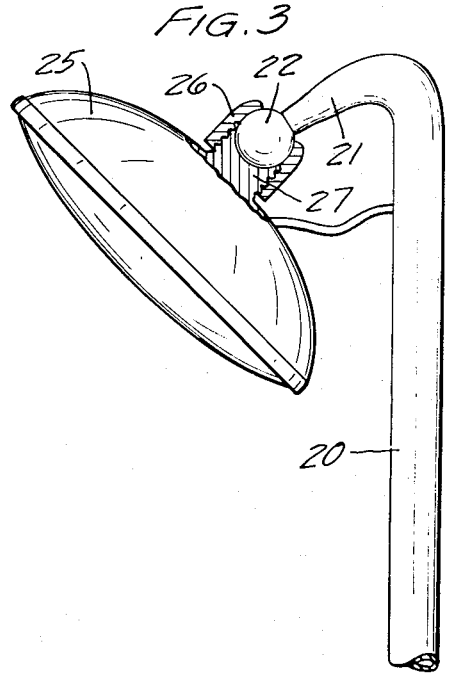
INVENTOR
CARL T. HALVORSON
BY Williamson, Williamson, Schroeder & Adams
ATTORNEYS

United States Patent Office 2,744,998
Patented May 8, 1956

2,744,998

REMOVABLE FOG LIGHT

Carl T. Halvorson, Ringsted, Iowa

Application April 17, 1952, Serial No. 282,797

1 Claim. (Cl. 240—7.1)

This invention relates to motor vehicles such as automobiles. More particularly, it relates to the use of fog lights upon motor vehicles as a means for providing increased vision through fog and the like.

It is a common practice to use fog lights on automobiles and similar vehicles for increased vision of the driver through fog and the like. Fog lights of a unidirectional type commonly known in the art are commonly mounted on the automobiles either at the level of the conventional head lights of the automobiles or at a level therebelow. To my knowledge, fog lights have not been positioned elsewhere upon an automobile since it has been commonly conceded that the lower the lights are mounted the better will be the illumination upon objects forwardly of the automobile. Where mists and rolling fogs lie in spaced clearance with the ground, it is true that improved illumination can be obtained by low level lighting. In heavy fog, however, the best of fog lights are incapable of adequately piercing the fog any substantial distance ahead of the automobile so that the driver is still very much handicapped under such conditions and driving is a dangerous operation. My invention is directed toward positioning a unidirectional fog light projector so as to obtain increased visionary results and toward apparatus for so doing.

It is a general object of my invention to provide a structure for use with a motor vehicle such as an automobile which will furnish increased vision under adverse weather conditions.

A more specific object is to provide a unidirectional fog light projector and a means or mounting therefor for use in combination with an automobile which will substantially increase the vision of the driver under adverse weather conditions.

Another object is to provide a novel and improved fog light mounting structure of cheap and simple construction for use in combination with an automobile and readily accessible and detachable from the automobile.

Another object is to provide a lighting assembly for use in combination with a motor vehicle which, when assembled and mounted upon the vehicle, will dispose the light throwing lamp in a new and improved position relative to the vehicle and the road to provide increased vision for the driver.

These and other objects and advantages of my invention will more fully appear from the following description made in connection with the accompanying drawings, wherein like reference characters refer to the same or similar parts throughout the several views, and in which:

Fig. 1 is a fragmentary side elevational view of a motor vehicle with one embodiment of my invention mounted thereupon;

Fig. 2 is a fragmentary vertical sectional view on an enlarged scale taken through the mounting bracket of the embodiment shown in Fig. 1; and Fig. 3 is a fragmentary side elevational view on an enlarged scale of the upper end portion of the assembly with the swingable mounting for the fog lamp broken away and shown in section.

One embodiment of my invention is shown in Fig. 1 mounted upon an automobile indicated generally as 5 and having a roof 6, a windshield 7 and a paneled body 8 such as is found on the conventional automobile of today, this paneled body generally being formed of sheet metal. The invention, as shown in Figs. 1–3, may include a tubular member comprising a bracket indicated generally as 9 which is adapted to clampingly engage the paneled body 8 of the automobile when inserted through an opening 8a formed in the panels of the body as shown in Fig. 2 and in the position shown in Fig. 1. As best shown in Fig. 2, this bracket 9 is formed of an angularly-bent tubular element 10 which is externally threaded at each of its end portions as at 11 and 12. Adajcent the threaded end portion 11 is an outwardly extending annular flange 13 which may be provided with a rubber washer 14 before the threaded end portion 11 is inserted in the opening 8a. A lock washer 15 is applied to the opposite and inner side of the panel 8 and a nut 16, when threaded upon the end portion 11 and tightened as shown in Fig. 2, serves to clamp the bracket 9 rigidly to the paneled body 8 with its other end portion 12 extending upwardly. Rigidly secured within the tubular element 10 is an insulated disc 17 through which extends a pair of conductor elements 18 and the inner ends of which are connected by wires 19 to a source of electrical power such as the battery of the automobile.

Furnished with the bracket 9 is an elongated tubular shank 20 which has a goose neck 21 and a ball 22 at its upper end portion. Adjacent the extreme lower end of the shank 20 is an outwardly extending annular flange 23 which forms an abutment shoulder for an internally threaded coupling 24 which, as shown in Fig. 2, is adapted to slide freely to a limited extent relative to the shank 20. This coupling member 24 is internally threaded and of such diameter to threadedly engage the externally threaded end portion 12 of the bracket as best shown in Fig. 2. As shown, the bracket 20 is of an external diameter approximately equal to the internal diameter of the tubular element 10 so that it will extend downwardly therewithin until the flange 23 abuts against the extreme upper end of the bracket 9. When the coupling 24 is tightened it serves to rigidly affix the shank 20 in upstanding position to the bracket 9 and relative to the automobile 5. The bracket 20 is of such a length that the upper end portion thereof extends a substantial distance above the roof 6 of the automobile preferably to a distance of about two feet.

A fog light projector 25, sometimes hereinafter referred to simply as fog light of the conventional type commonly known and currently on the market throughout the country is mounted upon the extreme upper end portion of the shank 20 by means of a socket 26 which is internally threaded to threadedly engage the externally threaded end portion of the mounting shank 27 of the fog light. By tightening the socket 26 the fog light is secured to the shank 20 so as to be freely movable universely and to be capable of being tightened for projection of unidirectional light in any adjusted position.

In use, the lighting assembly described above and comprising the bracket 9, the shank 20, and the fog light 25 is assembled as shown in Figs. 1–3 and affixed to the automobile 5 as shown in Fig. 1. This positions the fog light 25 several feet above the roof 6 of the automobile and permits the fog light to be directed forwardly and downwardly as shown in Fig. 1 ahead of the automobile and in the path of the direction of movement thereof. I have found that by so positioning a fog light the driver of the automobile is enabled to discern objects an appreciably greater distance ahead of the automobile than would otherwise be possible if the fog light were mounted in the conventional positions as described hereinbefore. The fact that the light from the fog light 25 is cast downwardly from above provides increased vision so that the dangers of driving in adverse weather conditions are substantially decreased.

When the weather conditions are such that no fog light is needed, the shank 20 may be readily removed by loosening the coupling 24 and removing the shank from the bracket 9. If desired, of course, a rubber covering similar to the type used in connection with aerials may be used to cover the coupling 24 when the fog light is being used and to cover the threaded end portion 12 of the bracket 9 when the fog light is removed and stored within the automobile. Thus it can be seen that I have provided a readily accessible and detachable fog light for an automobile which, when attached to the automobile, positions the fog light in a manner such that the light provided thereby substantially increases the vision of the driver so as to eliminate driving hazards by providing increased vision.

It will, of course, be understood that various changes may be made in the form, details, arrangements and proportions of the various parts without departing from the scope of my invention.

What is claimed is:

In an auxiliary lighting assembly for use with motor vehicles of the type having a roof and a panel body, said assembly comprising a bracket adapted to be rigidly mounted upon the panel body of the vehicle, said bracket including a tubular member bent angularly and being externally threaded at each of its end portions and having a flange extending outwardly adjacent one of the threaded end portions, a nut adapted to be threaded on the threaded end portion of said tubular member adjacent said flange to clamp the adjacent portions of the panel body therebetween when inserted through an opening in the panel body, a rigid shank having an outwardly extending flange adjacent its lower end portion, a coupling carried by said shank and being adapted to slide outwardly over its flange to a limited degree and to threadedly engage the other threaded end portion of said member to thereby rigidly affix said shank to said member in upright position, a unidirectional fog light projector mounted on the upper end portion of said shank and extending angularly thereto and being directed downwardly and forwardly relative to the forward direction of movement of the vehicle, the length of said shank being such that said fog light projector will normally be disposed several feet above the roof of the vehicle when said shank and said bracket are so connected whereby the driver of said vehicle as a consequence of the elevated position of said fog light projector will be enabled to discern objects in fog and the like ahead of said automobile, electrical conductor means connected to said fog light projector and extending along said shank, and cooperating electrical conductor means mounted within said shank and being connectable to a source of electric power within said tubular member.

References Cited in the file of this patent
UNITED STATES PATENTS

| | | |
|---|---|---|
| 1,420,075 | Berge | June 20, 1922 |
| 1,724,575 | Frey | Aug. 13, 1929 |
| 1,965,801 | Gandillon | July 10, 1934 |
| 2,000,743 | Cohen | May 7, 1935 |
| 2,185,164 | Weinreb | Dec. 26, 1939 |
| 2,379,942 | Webber | July 10, 1945 |
| 2,484,796 | Ackerman | Oct. 11, 1949 |
| 2,522,189 | Morrow | Sept. 12, 1950 |
| 2,586,643 | Garlow | Feb. 19, 1952 |
| 2,603,700 | Martin | July 15, 1952 |